May 29, 1951  S. RUBEN  2,554,504
RECHARGEABLE CELL
Filed June 29, 1948
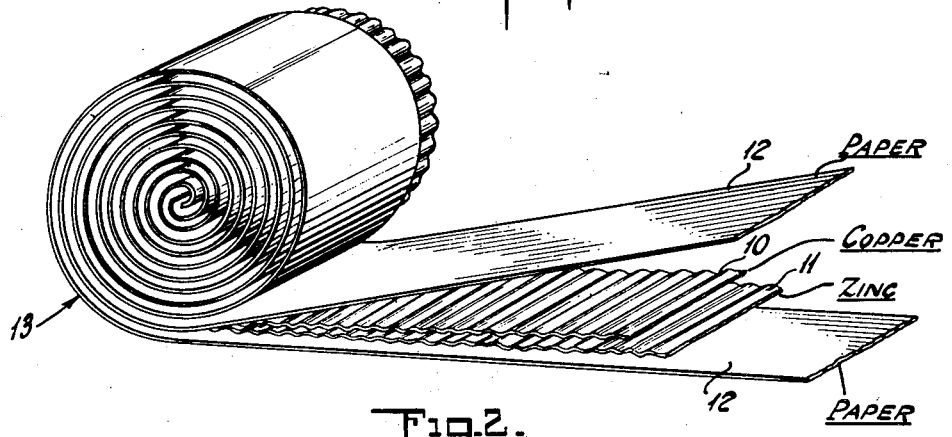
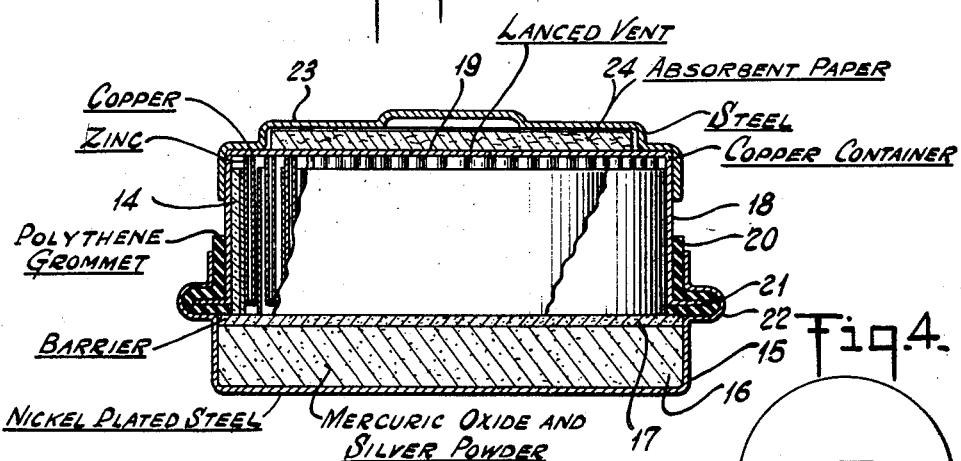
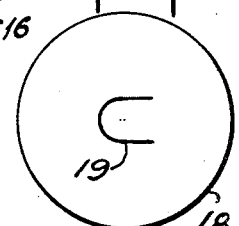
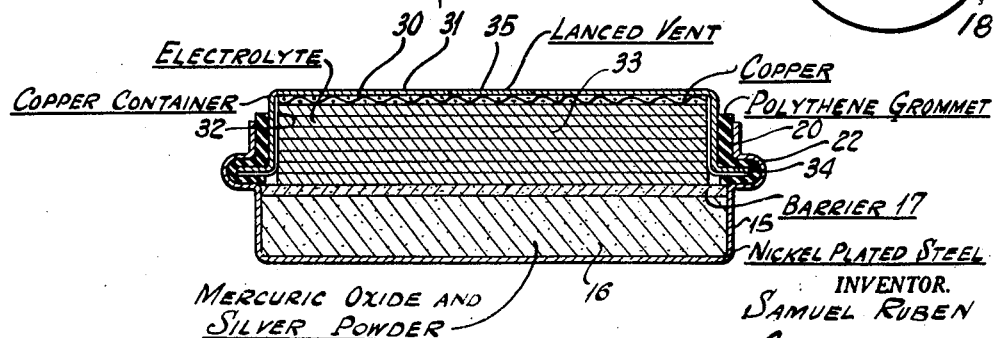
INVENTOR.
SAMUEL RUBEN
BY Nicholas Laing Jr.
ATTORNEY Patented May 29, 1951

2,554,504

UNITED STATES PATENT OFFICE 2,554,504

RECHARGEABLE CELL

Samuel Ruben, New Rochelle, N. Y.

Application June 29, 1948, Serial No. 35,831

13 Claims. (Cl. 136—7)

This invention relates to rechargeable cells, and, more particularly, to rechargeable or secondary cells suitable for use in all types of portable electrical equipment, such as hearing aids, measuring instruments, radio transmitters and receivers, and the like.

It is an object of the present invention to provide rechargeable cells of novel and improved character.

It is another object of the present invention to provide a rechargeable or secondary cell capable of being charged and discharged a large number of times without appreciable loss of its current storage capacity or overall efficiency.

A further object of the invention is to provide an airtight sealed alkaline secondary cell characterized by a high capacity-volume ratio which can be readily manufactured and sold on a practical and commercial scale at a low cost.

Other and further objects and advantages of the invention will be apparent from the following description, taken in conjunction with the accompanying drawing, in which:

Fig. 1 is a perspective view illustrating the method of making the negative electrode structure of a cell embodying the invention;

Fig. 2 is a vertical sectional view of a preferred embodiment of the invention in a sealed secondary cell;

Fig. 3 is a similar view of a modified embodiment of the invention; and

Fig. 4 is a top elevational view of the negative electrode shells shown in Figs. 2 and 3.

Broadly stated, according to the principles of my invention, there is provided a secondary cell the operation of which is based upon the electrodeposition of zinc on the negative electrode on charging the cell and dissolving such zinc on discharge of the cell. The positive electrode of the cell of the invention preferably comprises an oxide of mercury, such as mercuric oxide, which is electrolytically reduced to metallic mercury on discharging and is electrolytically oxidized on charging. The negative electrode of the cell essentially comprises zinc together with mercury as its active ingredient, such mercury being present in the form of zinc amalgam. The electrolyte of the cell is an aqueous solution of an alkali metal hydroxide, such as potassium hydroxide, initially containing a substantial quantity of alkali metal zincate, such as potassium zincate, said zincate being present in an amount sufficient to reduce the open circuit reactivity between the cell electrodes and the electrolyte to a negligible value. Preferably, the electrolyte is immobilized, for example by absorbing it in a suitable porous spacer element interposed between the electrodes. Electrolytes of the described character are more fully disclosed in my Patent No. 2,422,045. A suitable ionically permeable barrier layer is provided between electrodes to prevent migration of deleterious particles of the cell materials from one electrode to the other.

The preferred electrode structure comprises a negative electrode in the form of a roll of metal strip or foil and a positive electrode in the form of a compressed coherent body of an electronically conducting metal oxide.

I have discovered that in a satisfactory secondary cell employing mercury as the anodically oxidizable material, the following three conditions should be satisfied:

1. A sufficient quantity of mercury should be provided at the negative electrode so that all of the zinc electrodeposited thereon is immediately amalgamated.

2. The distance between the positive and the negative electrodes should desirably be maintained substantially constant throughout the useful life of the cell. This condition is not provided by a cell structure in which the negative electrode is in the form of a roll of amalgamated zinc foil because the portions of such electrode closest to the positive electrode will be first consumed, thereby irreversibly increasing the effective distance between the electrodes. Electrode structures fully satisfactory for the purposes of the invention will be disclosed as the description proceeds.

3. Since mercuric oxide, the preferred positive electrode material, is not a good conductor, it requires the admixture of a material of higher conductivity in order to reduce the internal resistance of the cell. This material cannot be of an inert character, such as the graphite admixture disclosed in my Patent No. 2,422,045. When graphite is used, the mercury formed on reduction of the mercuric oxide is in minute particles which in the presence of pressure or vibration coalesce into larger particles. These large mobile particles of mercury undesirably reduce the internal contact pressure and may also be the cause of short circuits between the cell electrodes.

I have discovered that silver, preferably in powder form, satisfies both the requirement of reducing the resistance of mercuric oxide and at the same time eliminates the danger of coalesced mercury particles as it immediately amalgamates with the mercury to form a solid electrode structure. Moreover, silver does not interfere in any way with the mercury anodically oxidizing.

A further important consideration with respect to the material added to the mercuric oxide is that its oxide must have a higher potential with respect to zinc in the cell electrolyte than mercury so that the material remains in the metallic state until substantially all of the mercury has been oxidized thereby preserving the low internal resistance of the positive electrode and of the entire cell. This further consideration is likewise fully met by silver, the oxide potential of which with respect to zinc in a potassium hydroxide electrolyte is 1.52 volts as compared to the potential of mercuric oxide under similar conditions, which is 1.35 volts.

These results and multiple functions of silver outlined in the foregoing are obviously not duplicated by the admixture of an inert material of higher conductivity, such as graphite, to the mercuric oxide. Graphite will, of course, form no amalgam with the reduced mercury and will not anodically oxidize after complete oxidation of the mercury, thereby causing detrimental gas generation upon continued charging.

I have found that the quantity of silver powder added to the mercuric oxide may be in the range of 10% to 30% by weight, 15% to 20% being the preferred range. If the addition of silver is less than 10%, the internal resistance of the cell would in most cases be undesirably high (for instance with loads of 50 to 100 milliamperes with an effective positive electrode area of 0.5 sq. in.) and the reduced mercury will not be in an immobile condition.

Referring now to Figs. 1 and 2 of the drawing, a preferred embodiment of the invention will be described. The negative electrode comprises a copper foil 10 and a zinc foil 11 which are superposed upon each other in face-to-face contacting relation and are interwound with spacer strips 12 to constitute a roll electrode structutre generally denoted by reference numeral 13. The two metal foils 10 and 11 are arranged in staggered relation with respect to spacer strips 12 so that in the finished roll electrode the metal foils protrude at one end of the roll. As will be best noted in Fig. 1, both metal foils are corrugated in order to accommodate swelling of the spacer strips when impregnated with the electrolyte. The preferred material for the spacer strips 12 is absorbent hemp or cotton base paper.

The completed roll electrode structure is surrounded with a styrene sleeve 14 confining the roll and also insulating the same from the inner circumferential surface of the electrode container.

Referring to Fig. 2, reference numeral 15 denotes a positive electrode container or shell formed of nickel plated or silver plated steel. In this shell there is provided a compressed body 16 comprising an intimate mixture of mercuric oxide and of a smaller amount of precipitated silver powder constituting the positive electrode of the cell. Preferably, this electrode is first formed into a pellet under a pressure of 15,000 pounds per square inch and is then further compressed and consolidated in the shell at a pressure of 30,000 pounds per square inch. On top of the positive electrode body 16, there is provided a barrier 17 constituted of an ionically permeable inert material capable of preventing the passage of detrimental particles from the positive to the negative electrode. This barrier may be formed of dialysis paper but in general it is preferred to use a non-cellulosic material such as a sheet pressed from styrene fibres. Another suitable material is pressed asbestos fiber sheet. While parchmentized paper may provide satisfactory results, the use of this material somewhat limits the shelf life of the cell particularly at high-ambient temperatures due to oxidation of the cellulose by contact with the oxide depolarizer.

Negative electrode roll structure 13 with styrene sleeve 14 therearound is inserted in negative electrode container or shell 18. This shell is preferably composed of copper although suitable copper base alloy can be used. Both the negative electrode container 18 as well as the foils of the negative electrode roll 13 are amalgamated prior to assembly of the cell. As will be noted in Fig. 2, the upper end of the negative electrode roll and comprising the protruding edges of corrugated foils 10 and 11 extend and are pressed against the inner top surface of container 18 in order to provide good electrical contact therewith. At the other end of the roll electrode structure, the metal foils are separated from barrier 17 by the protruding edge of spacer strips 12 which provide additional spacing means between the negative and positive electrodes.

Prior to final assembly of the cell, the anode roll is impregnated with the electrolyte which is preferably an aqueous solution of potassium hydroxide containing initially a substantial quantity of potassium zincate in order to reduce the open circuit reactivity of the cell materials to a negligible value.

Preferably in cells of the described character, the quantity of zinc present in the negative electrode is balanced with the maximum depolarizing ability of the positive electrode obtained upon fully charging of the cell. By having the depolarizer content balanced with or in excess of the quantity of zinc present in the cell, hydrogen generation after complete exhaustion of the depolarizer is avoided.

Although under normal operating conditions no gas generation will occur in the cell, the possibility of such gas generation still remains in case the cell is considerably overcharged. In order to avoid even this remote danger of producing excessive internal pressures, a lanced vent 19 is provided in the top wall of negative electrode shell 18. This is preferably provided in the form of a U-shaped slit stamped in said wall and defining a tongue which is pressed back into normal sealing relation with the remainder of the wall (Fig. 4). Upon substantial increase of the internal pressure of the cell, vent 19 will open and will release such pressure. A similar venting arrangement is disclosed and claimed in application Serial No. 585,143, filed March 27, 1945, by Fred D. Williams, Jr., now Patent No. 2,525,436, granted October 10, 1950.

An insulating grommet 20 of polythene, neoprene or of some other suitable elastomer is stretched around circumferential flange 21 of shell 18. The upper terminal regions of positive electrode shell 15 are crimped around the said grommet as indicated at 22, thereby defining an air-tight enclosure for the cell.

Upon operation of vent 19 a small quantity of cell material, such as some electrolyte, may be discharged through the open vent. To avoid potential injury to equipment adjacent to the cell, a dished steel hood or cap 23 is pressed on top of shell 18, internally defining therewith a shallow storage space for safely retaining and holding such materials. A disc 24 of absorbent paper may be provided in this space for absorbing and immobilizing any discharged materials. This absorbent paper may be acidified and dried with such crystalline acids, as boric, oxalic, citric acid, so as to neutralize the vented alkali.

In a practical rechargeable cell for hearing aids of the described type the positive electrode shell 15 had an inner diameter of 0.8" and a height of 0.25". The negative electrode shell 18 had an inner diameter of 0.75" and a height of 0.25". The negative electrode was constituted by a zinc foil 11 of the purest grade zinc having a thickness of 0.004", a width of 0.250" and a length of 20". Its weight was 2.5 g. and the strip or foil was corrugated to 0.007" thickness by providing 40 corrugations to 1 inch. The copper foil 10 was carefully cleaned to free it from oxide, it had a thickness of 0.001", a width of 0.250" and a length of 20". Its weight was 0.95 g. and it was corrugated to 0.004" thickness by providing thereon 40 corrugations to one inch. The complete roll structure 13 constituting the negative electrode of the cell comprised 16 turns of the foils 10 and 11 and when completed was 0.365" high and had a diameter of 0.75".

The positive electrode shell 18 was composed of copper which is acid cleaned so that it readily amalgamates in contact with the anode roll. The negative electrode roll 13 was amalgamated after immersion in the electrolyte with 0.5 g. of mercury Thereafter it was heat-treated for a period of four hours at 60° C. to completely diffuse the mercury into the zinc foil and to amalgamate the contacting surface of the copper foil. The positive electrode comprised 10 g. of an intimate mixture of 80% by weight of mercuric oxide and 20% of silver powder. The silver powder was of the micronized type and milled for several hours with the mercuric oxide. This mixture is then consolidated at high pressure into discs which are then broken up into granules of about 30 mesh size. This mixture was prepelleted at 6000 lbs. per square inch pressure and was consolidated in positive electrode shell 15 at a pressure of 12,000 lbs. per square inch to constitute a compressed body approximately 0.160" thick.

The electrolyte had a composition comprising 100 parts by weight of potassium hydroxide, 16 parts by weight of zinc oxide and 100 parts by weight of water. The quantity of electrolyte absorbed in the negative electrode roll was 1.64 cc. and its weight 2.445 g. Sufficient mercury was incorporated by amalgamation in the negative electrode so that an amalgam was immediately formed upon the deposition of zinc on said electrode when recharging the cell. The provision of such adequate mercury content at the negative electrode was found to be necessary to assure a long useful life for the cell.

It will be readily appreciated that the described negative electrode construction comprising superposed zinc and copper foils wound up with a porous spacer strip into a roll permanently assures the constant distance between the negative and positive electrodes. This is due to the fact that the copper foil is not dissolved during normal discharging operation of the cell and constitutes a conducting base of constant configuration on which zinc may be deposited upon charging, and on which mercury may be collected upon discharging. While the use of the rolled zinc and copper foils interwound with a suitable spacer is the preferred combination, it is also possible to use a zinc-plated copper foil or a copper foil sprayed with zinc by the Schoop process. The sprayed zinc surface provided in this manner is quite porous and is capable of giving a very high effective electrode area. It is also possible to use various other electrode structures according to the practical application for which the rechargeable cell of the invention is intended. Examples of such alternative electrode structures are disclosed in my aforesaid prior Patent No. 2,422,045 and also in my co-pending application Serial No. 729,707, filed February 20, 1947, of which the present application is a continuation-in-part.

The modified embodiment of the invention illustrated in Fig. 3 is in many respects similar to the one described in the foregoing and similar reference numerals have been used to denote corresponding parts. Thus, it will be noted that the modified cell comprises a positive electrode shell of nickel-plated steel 15 having a positive electrode body 16 including an intimate mixture of mercuric oxide and precipitated silver powder compressed therein. A barrier layer 17 is provided on the top surface of positive electrode 16.

The negative electrode is provided in the form of an amalgamated copper wire screen 30 pressed against the inner top surface of negative electrode shell 31 of pure copper. The circumferential portions of the inner surface of shell 31 are coated with a thin layer of a suitable insulating material 32 masking these regions of the shell and thus restricting the action of the electrolyte to screen 30. This masking layer may be formed of a suitable insulative varnish or lacquer, such as one of the polyvinyl chloride type, or may be in the form of a tightly fitting self-supporting insulative insert.

The inner space of the cell between barrier 17 and negative electrode screen 30 is filled out with an immobilized body of alkaline electrolyte of the type disclosed in the foregoing which is absorbed in a plurality of superposed spacer discs 33 of paper or of some other suitable absorbent material inert to the electrolyte. An insulative grommet 20 is placed around flange 34 of negative electrode shell 31 and is compressed by crimped terminal regions 22 of the positive electrode shell 31, thereby airtightly sealing the cell and at the same time electrically insulating from each other the two electrode shells also constituting the cell terminals. A lanced vent 35 is provided in the top wall of negative electrode shell 31 for reasons set forth more fully in the foregoing. In view of the similarity of construction, the operation of this modified embodiment will be readily understood without any detailed description.

While potassium hydroxide is the preferred electrolyte, sodium hydroxide or lithium hydroxide electrolytes may be used with similar results. While not in all cases necessary, the presence of a substantial zincate content in the electrolyte is desirable and results in a minimum of internal local action. This addition also reduces the danger of hydrogen generation upon overcharging the cell. Also, in some cases it is advantageous to add a suitable gelling agent, such as sodium carboxy-methyl cellulose, to the electrolyte thereby converting it into a gel of rubbery consistency.

In the embodiments of the invention described in the foregoing, zinc is provided at the negative electrode and an intimate mixture of mercuric oxide and silver powder at the positive electrode, so that the cell is first used as a primary cell which is capable of being recharged upon full or partial discharge. This is the preferred form of practicing the invention. It is also possible, however, to prepare a cell embodying the principles of the invention in which initially no zinc is present at the negative electrode and to provide a positive electrode in the form of an amalgam slug comprising mercury and silver amalgam. In this case it is desirable for best results to use an electrolyte having a considerably higher zinc ion concentration or alkali metal zincate content, such as one of the type disclosed in my aforesaid copending application Serial No. 729,707 and comprising 100 parts by weight KOH, 30 parts by weight ZnO and 100 parts by weight $H_2O$.

Generally speaking, for minimum internal resistance change it is preferred not to discharge the cell of the invention completely, i. e. until all of the depolarizer present has been consumed, but to recharge it after it has been discharged to the extent of about one-half of its full capacity.

The electrochemical cell system may be shown as

$$Zn \mid Zn(OH)_2 sKOH(aq) HgO_s \mid Hg$$

The overall reaction on passage of two Faradays could be expressed as follows:

On discharge, $Zn + H_2O + HgO \rightarrow Zn(OH)_2 + Hg$
On charge, $Zn(OH)_2 + Hg \rightarrow Zn + HgO + H_2O$ Electrode reactions:

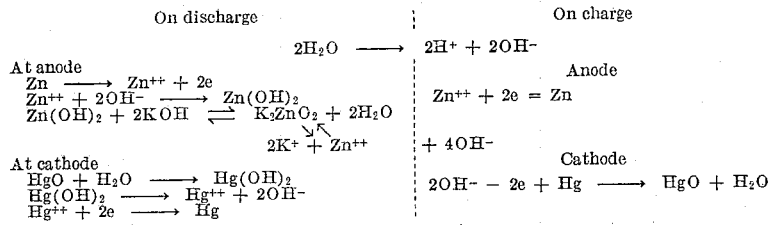

In the foregoing equations the symbol "e" denotes one electron.

Although the present invention has been disclosed in connection with a few preferred embodiments thereof, variations and modifications may be resorted to by those skilled in the art without departing from the principles of the invention. I consider all of these variations and modifications to be within the true spirit and scope of the invention, as disclosed in the foregoing description and defined by the appended claims.

What is claimed is:

1. In a sealed rechargeable cell, the combination comprising a positive electrode containing a mixture of an oxide of mercury and of a metal powder capable of being amalgamated, a negative electrode of amalgamated zinc, an immobilized alkaline electrolyte interposed between and in contact with said electrodes, the oxide of said metal powder having in said electrolyte a potential with respect to zinc which is higher than that of said oxide of mercury, and an electrode carrier of inert metal having an amalgamated surface in contact with the exposed surface of said negative electrode maintaining the effective distance between the electrodes substantially constant.

2. A sealed rechargeable alkaline cell comprising an electrode of mercury oxide and silver, a cooperating electrode comprising zinc and mercury, immobilized electrolyte of an alkali metal hydroxide, and an electrode carrier of inert metal having an amalgamated surface in contact with the exposed surface of said negative electrode maintaining the effective distance between the electrodes substantially constant.

3. A sealed rechargeable cell comprising, in combination, a positive electrode including a major portion of an oxide of mercury and an addition of silver powder intimately mixed therewith, a negative electrode of amalgamated zinc, an immobilized electrolyte of an aqueous solution of an alkali metal hydroxide, and an electrode carrier of inert metal having an amalgamated surface in contact with the exposed surface of said negative electrode maintaining the effective distance between the electrodes substantially constant.

4. A sealed rechargeable cell comprising, in combination, a negative electrode of amalgamated zinc formed to provide a relatively high surface-to-volume ratio, a positive electrode in the form of a coherent conductive body of mercuric oxide intimately mixed with silver powder, an immobilized electrolyte formed of an aqueous solution of alkali metal hydroxide initially containing a substantial quantity of alkali metal zincate in solution, said zincate being present in an amount sufficient to reduce the open circuit reactivity between said electrolyte and said negative electrode to a negligible value, and an electrode carrier of inert metal having an amalgamated surface in contact with the exposed surface of said negative electrode maintaining the effective distance between the electrodes substantially constant.

5. A sealed secondary cell comprising, in combination, a coherent conductive positive electrode containing mercuric oxide as the active ingredient intimately mixed with a smaller quantity of silver powder, an amalgamated negative electrode of zinc, an immobilized electrolyte comprising an aqueous potassium hydroxide solution initially containing a substantial quantity of potassium zincate interposed between said electrodes, the quantity of said silver powder being sufficient to form an amalgam with substantially all of the metallic mercury reduced from the mercuric oxide during operation of the cell, and an electrode carrier of inert metal having an amalgamated surface in contact with the exposed surface of said negative electrode maintaining the effective distance between the electrodes substantially constant.

6. A sealed secondary cell comprising, in combination, a positive electrode in the form of a compressed coherent conductive body containing mercuric oxide and about 10% to 30% by weight of silver powder intimately mixed therewith, a negative electrode of amalgamated zinc, an immobilized electrolyte comprising an aqueous potassium hydroxide solution initially containing a substantial quantity of potassium zincate interposed between said electrodes, the quantity of said silver powder being sufficient to substantially increase the conductivity of the positive electrode and to form an amalgam with substantially all of the metallic mercury reduced from the mercuric oxide during operation of the cell, and an electrode carrier of inert metal having an amalgamated surface in contact with the exposed surface of said negative electrode maintaining the effective distance between the electrodes substantially constant.

7. A sealed secondary cell comprising, in combination, a positive electrode in the form of a compressed coherent conductive body containing mercuric oxide and about 15% to 20% by weight of silver powder intimately mixed therewith, a negative electrode carrier of amalgamated metal upon which zinc is deposited during operation of the cell constituting therewith the negative electrode, and an immobilized electrolyte comprising an aqueous potassium hydroxide solution initially containing a substantial quantity of potassium zincate interposed between said electrodes, said negative electrode carrier being formed of metal generally non-reactive with the electrolyte thereby preserving constant distance between the electrodes throughout the life of the cell and containing sufficient mercury to amalgamate the zinc deposited thereon.

8. A secondary cell comprising, in combination, a pair of electrode shells, a positive electrode of mercuric oxide intimately mixed with a smaller quantity of silver powder compressed in one of said shells, a negative electrode of amalgamated copper base material in the other of said shells, an immobilized electrolyte comprising an aqueous alkali metal hydroxide solution initially containing a substantial quantity of alkali metal zincate interposed between and in contact with said electrodes, and an insulative gasket compressed between cooperating terminal regions of said shells and defining therewith a sealed enclosure for the cell.

9. A secondary cell comprising, in combination, a lower shell, a positive electrode compact compressed in the bottom of said shell including an intimate mixture of mercuric oxide and silver powder, a negative electrode-spacer structure comprising a roll of negative electrode foil interleaved with absorbent sheet spacer material, the edge of said foil projecting at a first end of said roll and spacer material projecting at the second end of said roll, an aqueous alkali metal hydroxide electrolyte absorbed in said spacer material, said second end of said roll pressing against the top of said compact, an upper shell pressing against the first end of said roll, and insulating sealing material compressed between cooperating portions of said shells.

10. A secondary cell comprising, in combination, a pair of metal shells, a positive electrode including an intimate mixture of mercuric oxide and silver powder compressed in one of said shells, a negative electrode-spacer structure comprising a roll of amalgamated copper base foil interleaved in staggered relation with absorbent sheet spacer material in the other of said shells, the exposed edge of said foil being in pressure contact with said shell, an aqueous potassium hydroxide electrolyte initially containing a substantial quantity of potassium zincate absorbed in said spacer material, whereby upon charging of said cell zinc is deposited on said foil and is amalgamated by the mercury present therein, and an insulative gasket locked between cooperating terminal regions of the said shells and hermetically sealing the cell.

11. A secondary cell comprising, in combination, a first and a second metal shell, a positive electrode including an intimate mixture of mercuric oxide and silver powder compressed in one of said shells, a negative electrode-spacer structure in the other of said shells, said structure comprising a roll of superposed amalgamated copper and zinc foils interleaved in staggered relation with absorbent sheet spacer material, the exposed edges of said foils being in pressure contact with the inner surface of the lastnamed shell, an aqueous potassium hydroxide electrolyte initially containing a substantial quantity of potassium zincate absorbed in said spacer material, a barrier layer interposed between the exposed edge of said spacer material and the exposed surface of the positive electrode, and insulative means interlocked with flanges of said shells to hermetically seal the cell.

12. A secondary cell comprising, in combination, a nickel plated steel shell, a positive electrode including mercuric oxide and silver powder compressed in said shell, a copper base shell having a negative electrode-spacer structure therein, said structure comprising a roll of corrugated amalgamated copper and zinc foils in direct surface contact with each other and jointly interleaved in staggered relation with a strip of absorbent spacer material, the exposed edges of said foils being in pressure contact with the inner surface of the copper base shell, an alkaline electrolyte absorbed in said spacer material, and an ionically permeable barrier layer in contact with and extending across the active accessible surface of the positive electrode, said barrier layer being sufficiently impermeable to prevent migration of solids from one electrode to the other, and insulative means defining with said shells a sealed cell enclosure.

13. A secondary cell comprising, in combination, a pair of metal shells, a positive electrode including mercuric oxide and silver powder compressed in one of said shells, a foraminous negative electrode of copper base material within and in electrical contact with the bottom surface of the other of said shells, a layer of insulating material masking the remainder of the inner surface of said last-named shell, an immobilized body of alkaline electrolyte interposed between and in contact with said electrodes, and an insulative gasket crimped between interlocked cooperating portions of said shells and defining therewith a sealed cell enclosure.

SAMUEL RUBEN.

REFERENCES CITED

The following references are of record in the file of this patent:

UNITED STATES PATENTS

| Number | Name | Date |
| --- | --- | --- |
| 618,993 | Paget | Feb. 7, 1899 |
| 640,006 | Lindengerger et al. | Dec. 26, 1899 |
| 727,117 | Edison | May 5, 1903 |
| 793,078 | Hubbell | June 27, 1905 |
| 940,043 | Morrison | Nov. 16, 1909 |
| 975,980 | Morrison | Nov. 15, 1910 |
| 976,092 | Morrison | Nov. 15, 1910 |
| 1,611,153 | Benner et al. | Dec. 21, 1926 |
| 1,732,069 | Schorger | Oct. 15, 1929 |
| 2,422,045 | Ruben | June 10, 1947 |

OTHER REFERENCES

Vinal, G. W.: Electrical Engineering, May 1948, page 465.